US012597204B2

(12) United States Patent (10) Patent No.: US 12,597,204 B2
Mizumi et al. (45) Date of Patent: Apr. 7, 2026

(54) MODEL GENERATING DEVICE, MODEL GENERATING SYSTEM, MODEL GENERATING METHOD, AND PROGRAM

(71) Applicant: MITSUBISHI HEAVY INDUSTRIES, LTD., Tokyo (JP)

(72) Inventors: Shunsuke Mizumi, Tokyo (JP); Soichiro Tabata, Tokyo (JP); Koji Ishibashi, Tokyo (JP); Tadashi Takahashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 120 days.

(21) Appl. No.: 18/685,611

(22) PCT Filed: Feb. 2, 2023

(86) PCT No.: PCT/JP2023/003426
§ 371 (c)(1),
(2) Date: Feb. 22, 2024

(87) PCT Pub. No.: WO2023/199575
PCT Pub. Date: Oct. 9, 2023

(65) Prior Publication Data
US 2025/0131650 A1      Apr. 24, 2025

(30) Foreign Application Priority Data
Apr. 12, 2022    (JP) ................................. 2022-065661

(51) Int. Cl.
*G06T 17/10* (2006.01)
(52) U.S. Cl.
CPC ................................... *G06T 17/10* (2013.01)

(58) Field of Classification Search
CPC .......... G06T 17/10; G06T 7/60; G06T 17/00; G06T 17/30; G01B 11/00; G01B 21/20; G06F 30/10; G06F 30/12
See application file for complete search history.

(56) References Cited

U.S. PATENT DOCUMENTS 6,982,711 B1    1/2006  Takagi
11,809,789 B2   11/2023  Chang et al.
(Continued)

FOREIGN PATENT DOCUMENTS

JP     2007-085997 A    4/2007
JP     2013-032922 A    2/2013
(Continued)

OTHER PUBLICATIONS

Heuvel, 3D reconstruction from a single image using geometric constraints, ISPRS Journal of Photogrammetry & Remote Sensing 53 (1998) 354-368. (Year: 1998).*
(Continued)

*Primary Examiner* — Haixia Du
(74) *Attorney, Agent, or Firm* — WHDA, LLP

(57) ABSTRACT

Provided is a device that generates a three-dimensional model in a short amount of time. A model generating device according to the present invention comprises: an acquisition unit that acquires measurement data of a three-dimensional form of an object; a simple three-dimensional model generating unit that generates a three-dimensional model on the basis of the measurement data; a dimensions measurement unit that measures dimensions or position information of a predetermined portion of the object on the basis of the three-dimensional model; and a model generating unit that sets the dimensions or position information that is measured (Continued)

to a template of a parametric three-dimensional model of the object and generates a parametric three-dimensional model of the object.

12 Claims, 12 Drawing Sheets

(56) References Cited

U.S. PATENT DOCUMENTS

| | | | | |
|---|---|---|---|---|
| 2006/0140473 | A1* | 6/2006 | Brooksby | G01N 21/952 |
| | | | | 382/285 |
| 2014/0375769 | A1* | 12/2014 | Algreatly | G01B 7/004 |
| | | | | 348/46 |
| 2019/0086539 | A1 | 3/2019 | Shin et al. | |

FOREIGN PATENT DOCUMENTS

| | | | |
|---|---|---|---|
| JP | 2014-137244 | A | 7/2014 |
| JP | 2014-232113 | A | 12/2014 |
| JP | 6742036 | B1 | 8/2020 |
| KR | 102135560 | B1 | 7/2020 |
| KR | 20210102671 | A | 8/2021 |
| WO | 01/01075 | A2 | 1/2001 |
| WO | 02/23408 | A1 | 3/2002 |
| WO | 2010/123669 | A2 | 10/2010 |
| WO | WO-2019087032 | A1* | 5/2019 ............. G06F 30/17 |

OTHER PUBLICATIONS

Kubota Satoshi et al., Research for Generating Parametric Model of Bridge Using Point Cloud Data, IPSJ SIG Technical Report, May 2021, vol. 62, No. 5, pp. 1234-1245; w/English Abstract on front page.

Matsuzawa Hirofumi et al., A method for understanding drawing attributes for a 3D model., IPSJ SIG Notes, Feb. 17, 1995, vol. 95, No. 18, pp. 1-8; w/English Abstract on 3rd page.

International Search Report dated Apr. 25, 2023, issued in counterpart Application No. PCT/JP2023/003426. (5 pages).

Written Opinion dated Apr. 25, 2023, issued in counterpart Application No. PCT/JP2023/003426, with English Translation. (6 pages).

Andres Alberto, et al., Reverse Engineering of Turbine Blades with Internal Features, Proceedings of the 19th Annual International Congress of SOMIM, pp. 897-905, 2013 (9 pages).

* cited by examiner

100

10 MEASUREMENT DEVICE

20 MODEL GENERATING DEVICE

21 DATA ACQUISITION UNIT

22 INPUT RECEPTION UNIT

23 TEMPLATE CREATING UNIT

24 SIMPLE MODEL GENERATING UNIT

25 DIMENSION MEASUREMENT UNIT

26 MODEL GENERATING UNIT

27 OUTPUT UNIT

28 STORAGE UNIT

30 DISPLAY DEVICE

FIG. 5

-X DIRECTION 39.9 DEGREE

502

503

| ANGLE 3 | DESIGN COMPONENT | ACTUAL MEASUREMENT COMPONENT | DEVIATION | INSPECTION |
|---------|------------------|------------------------------|-----------|------------|
|  |  | +0.00 |  |  |

| DISTANCE 2 | | | | |
|---|---|---|---|---|
| ⟷ | DESIGN COMPONENT | ACTUAL MEASUREMENT COMPONENT | DEVIATION | INSPECTION |
| L | +0.00 | +8231.92 | +8231.92 | |

| DISTANCE 1 | | | | |
|---|---|---|---|---|
| ⟷ | DESIGN COMPONENT | ACTUAL MEASUREMENT COMPONENT | DEVIATION | INSPECTION |
| L | +0.00 | +8257.18 | +8257.18 | |

MANUALLY SELECT
POINTS OF CORNERS

| DISTANCE 1 | | | | |
|---|---|---|---|---|
| ↔ | DESIGN COMPONENT | ACTUAL MEASUREMENT COMPONENT | DEVIATION | INSPECTION |
| L | +0.00 | +8257.18 | +8257.18 | |

8257 mm

| DISTANCE 2 | | | | |
|---|---|---|---|---|
| ↔ | DESIGN COMPONENT | ACTUAL MEASUREMENT COMPONENT | DEVIATION | INSPECTION |
| L | +0.00 | +8231.92 | +8231.92 | |

Figure 9:
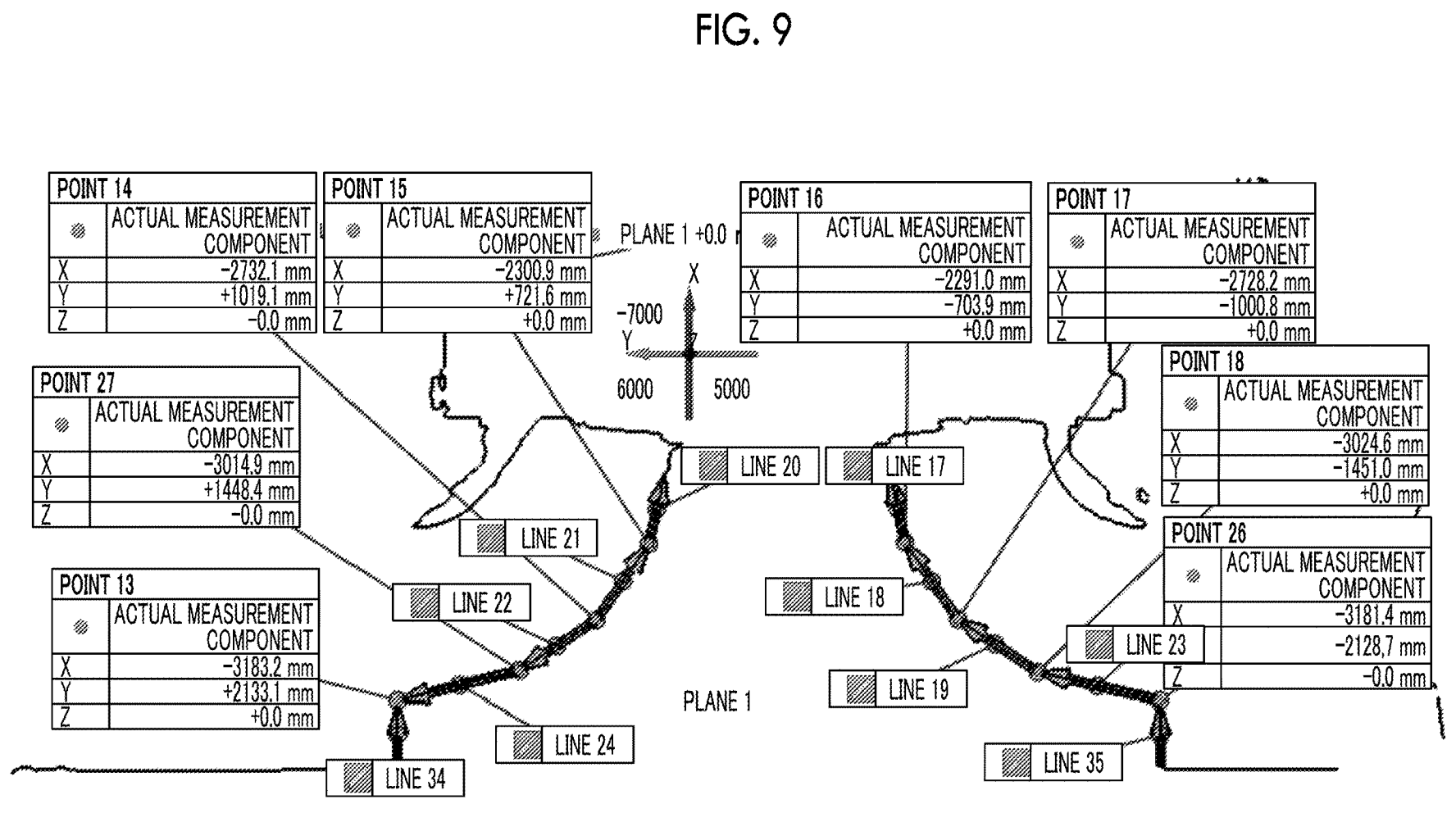

POINT 17

| | ACTUAL MEASUREMENT COMPONENT |
|---|---|
| X | −2728.2 mm |
| Y | −1000.8 mm |
| Z | +0.0 mm |

POINT 18

| | ACTUAL MEASUREMENT COMPONENT |
|---|---|
| X | −3024.6 mm |
| Y | −1451.0 mm |
| Z | +0.0 mm |

POINT 26

| | ACTUAL MEASUREMENT COMPONENT |
|---|---|
| X | −3181.4 mm |
| Y | −2128.7 mm |
| Z | −0.0 mm |

POINT 16

| | ACTUAL MEASUREMENT COMPONENT |
|---|---|
| X | −2291.0 mm |
| Y | −703.9 mm |
| Z | +0.0 mm |

POINT 15

| | ACTUAL MEASUREMENT COMPONENT |
|---|---|
| X | −2300.9 mm |
| Y | +721.6 mm |
| Z | +0.0 mm |

POINT 14

| | ACTUAL MEASUREMENT COMPONENT |
|---|---|
| X | −2732.1 mm |
| Y | +1019.1 mm |
| Z | −0.0 mm |

POINT 27

| | ACTUAL MEASUREMENT COMPONENT |
|---|---|
| X | −3014.9 mm |
| Y | +1448.4 mm |
| Z | −0.0 mm |

POINT 13

| | ACTUAL MEASUREMENT COMPONENT |
|---|---|
| X | −3183.2 mm |
| Y | +2133.1 mm |
| Z | +0.0 mm |

LINE 23

LINE 35

LINE 17

LINE 18

LINE 19

LINE 20

LINE 21

LINE 22

LINE 24

LINE 34

PLANE 1

PLANE 1 +0.0

X

Y

−7000

6000

5000

CIRCLE 13

| ◈ | ACTUAL MEASUREMENT | COMPONENT |
|---|---|---|
| X | | mm |
| Y | | mm |
| Z | | mm |
| φ | | mm |

CIRCLE 12

| ◈ | ACTUAL MEASUREMENT | COMPONENT |
|---|---|---|
| X | | mm |
| Y | | mm |
| Z | | mm |
| φ | | mm |

PLANE 1

PLANE 2 +0.0 mm

CIRCLE 9

| ◈ | ACTUAL MEASUREMENT | COMPONENT |
|---|---|---|
| X | | mm |
| Y | | mm |
| Z | | mm |
| φ | | mm |

PLANE 2

CIRCLE 8

| ◈ | ACTUAL MEASUREMENT | COMPONENT |
|---|---|---|
| X | | mm |
| Y | | mm |
| Z | | mm |
| φ | | mm |

MODEL GENERATING DEVICE, MODEL GENERATING SYSTEM, MODEL GENERATING METHOD, AND PROGRAM

TECHNICAL FIELD

The present invention relates to a model generating device, a model generating system, a model generating method, and a program. The present application claims priority based on Japanese Patent Application No. 2022-065661 filed in Japan on Apr. 12, 2022, the contents of which are incorporated herein by reference.

BACKGROUND ART

Large machines such as a low-pressure casing of a steam turbine generally have large manufacturing tolerances, and are often not always manufactured according to drawings. After operation, the internal structure of the turbine may have undergone thermal deformation or the like, and may deviate from the shape and the dimensions at the time of manufacture. In a case of evaluating performance of the internal structure of the turbine after long-term operation, it is very important to model an actual shape of the internal structure and to understand a flow state of the actual device. In particular, it is very important to quickly evaluate dimensions of a flow path portion of a diffuser, which affect the performance, in a form close to the actual shape to some extent. In a case where it is determined to replace a turbine made by another company with a turbine made by one's own company, in the related art, after the casing is opened, it takes several days to a week to measure dimensions of the casing using a tape measure, a laser measurement device, or the like. As a related technique, PTL 1 discloses a technique of measuring the entire shape of an object by using non-contact type measurement means such as a laser, creating composite shape data that represents a three-dimensional shape of the object as a combination of a cylinder, a curved surface, a plane, and the like based on data obtained by measurement, and creating CAD data from the composite shape data. However, in a case of processing of measuring the overall shape of the object via a laser or the like and generating CAD data, it is necessary to measure a large amount of data defining the overall shape of the object without omission. Therefore, a lot of time is required to generate a three-dimensional model. Even in a case where information can be acquired without omission of the shape, point group data obtained by a non-contact multi-point measurement device such as a laser or light detection and ranging (LiDAR) has too many data points (the data point density is too high) to be used for direct analysis. Further, the point group data includes fine noise, and as a result, it is necessary to rationally thin out the data points, which takes more time.

CITATION LIST

Patent Literature

[PTL 1] Japanese Unexamined Patent Application Publication No. 2013-32922

SUMMARY OF INVENTION

Technical Problem

There is a demand for a technique capable of generating a three-dimensional model of an object in a short time without drawing information.

The present disclosure provides a model generating device, a model generating system, a model generating method, and a program capable of solving the above-described problems.

Solution to Problem

According to an aspect of the present disclosure, there is provided a model generating device including: an acquisition unit that acquires measurement data of a three-dimensional shape of an object; a simple three-dimensional model generating unit that generates a three-dimensional model based on the measurement data; a dimension measurement unit that measures dimensions or position information of a predetermined portion of the object based on the three-dimensional model; and a model generating unit that generates a parametric three-dimensional model of the object by setting the measured dimensions or the measured position information in a template of the parametric three-dimensional model of the object.

According to another aspect of the present disclosure, there is provided a model generating system including: a measurement device that measures a three-dimensional shape of an object; and the model generating device.

According to still another aspect of the present disclosure, there is provided a model generating method including: a step of acquiring measurement data of a three-dimensional shape of an object; a step of generating a three-dimensional model based on the measurement data; a step of measuring dimensions or position information of a predetermined portion of the object based on the three-dimensional model; and a step of generating a parametric three-dimensional model of the object by setting the measured dimensions or the measured position information in a template of the parametric three-dimensional model of the object.

According to still another aspect of the present disclosure, there is provided a program causing a computer to execute a process including: a step of acquiring measurement data of a three-dimensional shape of an object; a step of generating a three-dimensional model based on the measurement data; a step of measuring dimensions or position information of a predetermined portion of the object based on the three-dimensional model; and a step of generating a parametric three-dimensional model of the object by setting the measured dimensions or the measured position information in a template of the parametric three-dimensional model of the object.

Advantageous Effects of Invention

According to the model generating device, the model generating system, the model generating method, and the program described above, it is possible to generate a three-dimensional model of an object in a short time.

BRIEF DESCRIPTION OF DRAWINGS

FIG. 5 is a first diagram explaining dimension measurement processing according to the embodiment of the present disclosure.

FIG. 6A is a second diagram explaining dimension measurement processing according to the embodiment of the present disclosure.

FIG. 6B is a third diagram explaining dimension measurement processing according to the embodiment of the present disclosure.

FIG. 6C is a fourth diagram explaining dimension measurement processing according to the embodiment of the present disclosure.

FIG. 9 is a fourth diagram explaining dimension measurement processing of a diffuser according to the embodiment of the present disclosure.

DESCRIPTION OF EMBODIMENTS

Embodiment (System Configuration)

Figure 1:
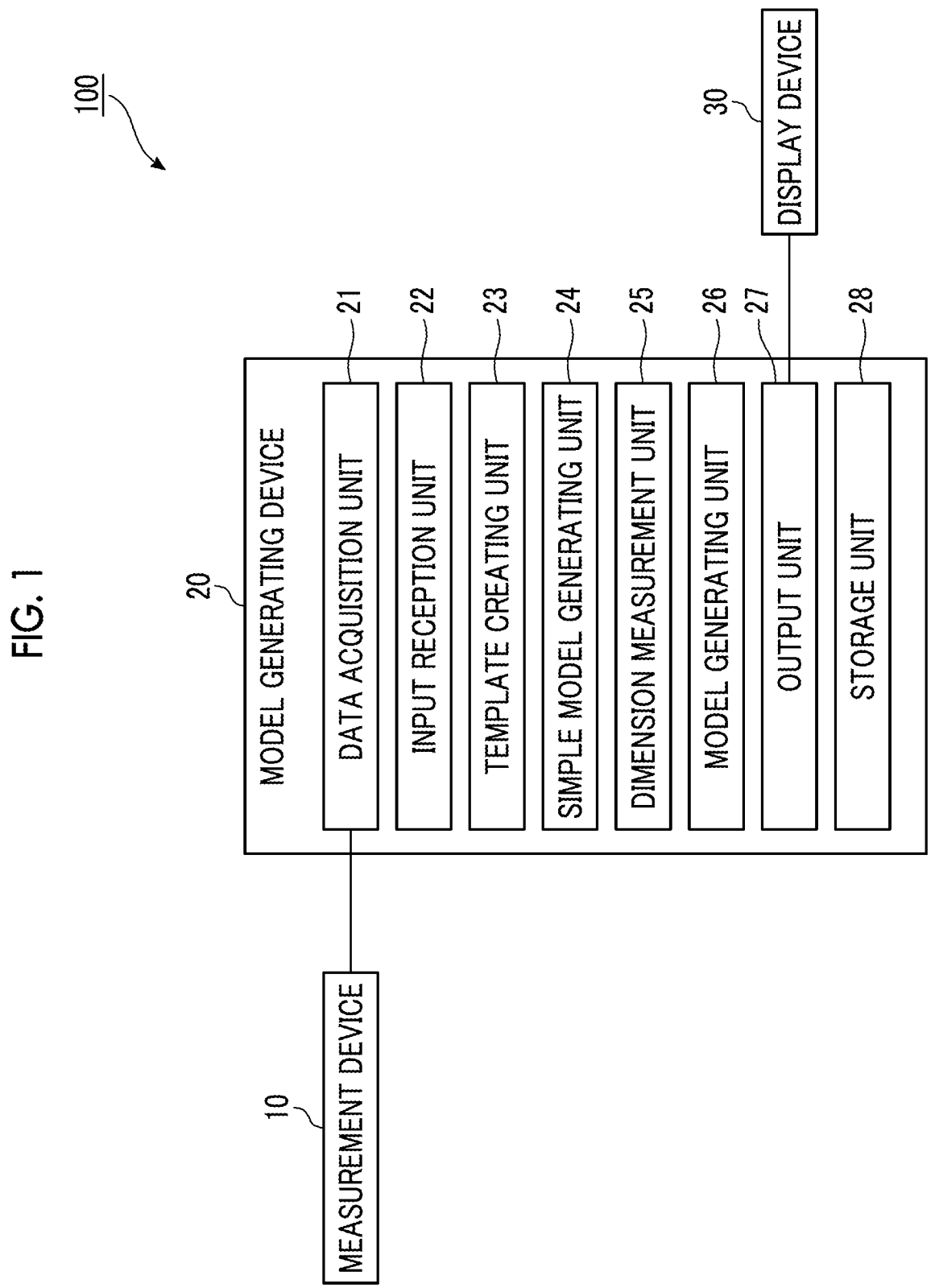
FIG. 1 is a block diagram illustrating an example of a model generating system according to an embodiment of the present disclosure.

Hereinafter, a model generating method according to an embodiment of the present disclosure will be described with reference to FIG. 1 to FIG. 13. FIG. 1 is a block diagram illustrating an example of a model generating system according to the embodiment of the present disclosure. A model generating system 100 includes a measurement device 10, a model generating device 20, and a display device 30. The model generating system 100 generates a three-dimensional model of an object for which there is no drawing information in a short time. The object is not particularly limited, and a three-dimensional model can be generated for various large machines and devices such as a turbine and a boiler. Hereinafter, a case where the object is a casing of a steam turbine will be described as an example.

Figure 2:
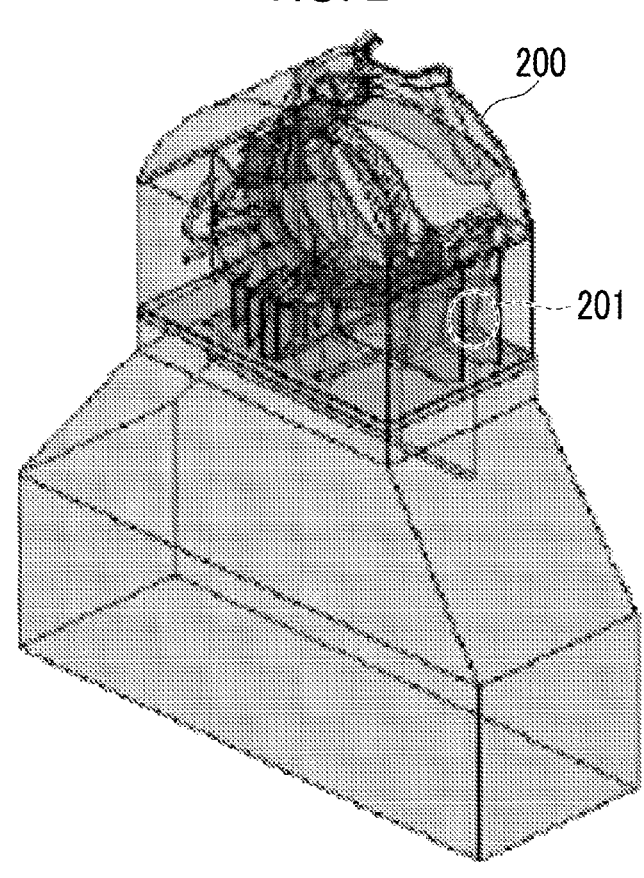
FIG. 2 is a diagram illustrating an example of a three-dimensional model based on drawing information of an object.

FIG. 2 illustrates an example of a three-dimensional model 200 based on computer-aided design (CAD) data (drawing information) of a casing of a steam turbine. A space surrounded by a flat surface and a cylindrical surface is provided inside the casing, and various structures such as pipes are provided in the space. Shapes of the inside and the outside of the casing form complicated shapes represented by a combination of a circle, an ellipse, a rectangular plane, a cylinder, and the like. In order to construct a three-dimensional model 200 based on CAD data as illustrated in FIG. 2 without drawing information, it is necessary to measure dimensions and position information of each portion of the casing for a long period of time. In a case where a manhole 201 provided on a side surface of the casing is opened, a person can enter the inside of the casing and perform an inspection or the like. However, in order to measure a space of the inside and a shape of each structure, it is necessary to build a scaffold. As a result, it is not easy to measure dimensions or the like that can be substituted for drawing information. For this reason, in the present embodiment, a template of a three-dimensional model of the casing shape is created in advance by using a parametric CAD function, and actual dimensions of the casing are applied to the template. Thereby, a parametric CAD model of the object is generated, and performance and the like are analyzed using the parametric CAD model. For the dimensions of the casing that are applied to the template, the shape of the inside of the casing is measured by the measurement device 10, and a simple three-dimensional model is temporarily generated based on a measurement result. In addition, necessary dimensions are measured based on the generated simple three-dimensional model. Thereby, a measurement time using the actual device can be significantly shortened, and the three-dimensional model can be generated in a short time.

The measurement device 10 is a non-contact sensor that measures a shape of an object. For example, the measurement device 10 is an imaging device such as a camera that captures a moving image or a still image, or a three-dimensional distance meter such as a laser scanner or a LiDAR. The measurement device 10 measures three-dimensional shapes of the inside and the outside of the object for which a three-dimensional model is to be generated.

Figure 3:
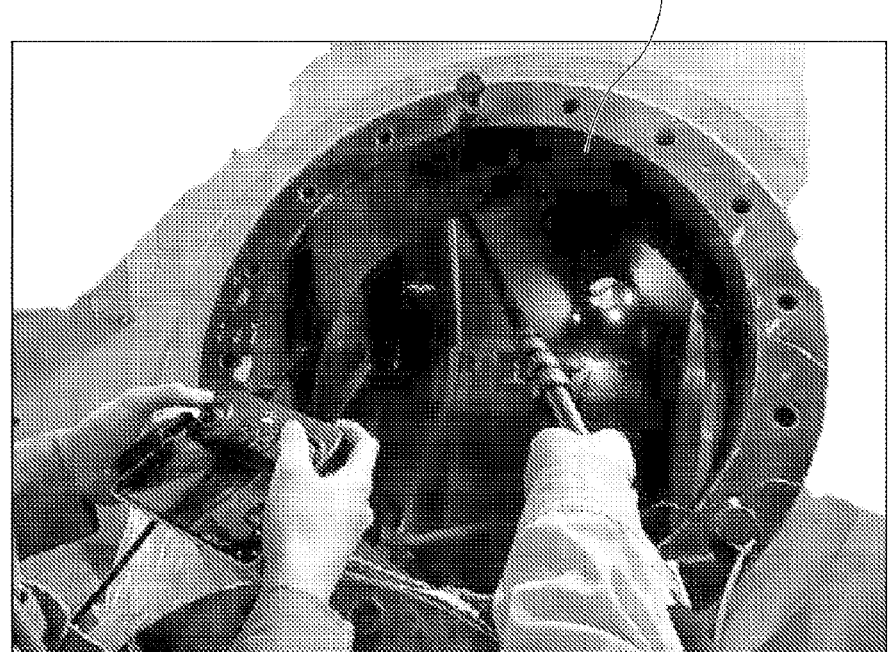
FIG. 3 is a diagram illustrating an example of processing of measuring a shape of an object according to the embodiment of the present disclosure.

FIG. 3 illustrates a way of measuring a shape of the inside of the casing of the steam turbine by using a camera as the measurement device 10. For example, a worker may measure a shape of the inside by causing a camera to be directed toward the inside through an opening such as a manhole 201 and to capture an image of the inside, or may measure a shape of the inside by causing a drone with a camera and a light to move toward the inside of the casing and to capture an image of the inside. Alternatively, a camera and a light may be mounted on a tip of an auxiliary tool such as a rod-shaped member, and a worker may insert the auxiliary tool into the inside of an exhaust chamber and cause the camera to capture an image of the inside. The capturing through the opening, the capturing using the drone, and the capturing using the auxiliary tool may be performed in parallel at the same time. The image captured by the camera may be a moving image or a still image. By using the drone or the auxiliary tool, it is possible to perform measurement in close proximity to a target portion even in a place where it is difficult for a person to directly enter, such as the inside of the casing of the steam turbine. Although an opportunity and a time for measuring the shape of the steam turbine to be operated by a user are limited, in the measurement by the camera, a wide range of images can be acquired at one time. Thus, the measurement can be completed in a short time. The measurement time can be further shortened by performing the capturing through the opening and the capturing using the drone or the auxiliary tool in parallel. Even in three-dimensional measurement, the shape of the object can be measured in the same manner as in the case of using the camera included in the drone or the auxiliary tool. Both measurement by image capturing using a camera and measurement by a three-dimensional distance meter may be performed in parallel. In the measurement by the three-dimensional distance meter, a range that can be measured at one time is narrower than a range that can be measured by the image capturing, but the measurement accuracy is improved. Therefore, for a portion where measurement accuracy is not required, measurement by image capturing may be performed, and for a portion where measurement accuracy is required, measurement by the three-dimensional distance meter may be performed.

The model generating device 20 includes a data acquisition unit 21, an input reception unit 22, a template creating unit 23, a simple model generating unit 24, a dimension measurement unit 25, a model generating unit 26, an output unit 27, and a storage unit 28.

The data acquisition unit 21 acquires measurement data indicating the shape of the object that is measured by the measurement device 10. The measurement data is, for example, an image captured by the camera or three-dimensional coordinate data measured by the three-dimensional distance meter.

The input reception unit 22 is configured with an input device such as a keyboard, a mouse, a touch panel, and a button, and receives an input from a user using the input device. For example, in dimension measurement using a simple three-dimensional model to be described later, the input reception unit 22 receives an input of a portion for which dimensions are to be measured and an input of a measurement method.

The template creating unit 23 creates a template that imitates a three-dimensional shape of the object and a list of setting items to be set in the template by using a parametric function provided in parametric-type CAD software. In a case where general-purpose CAD software is used, it is possible to create an arbitrary model, but it takes time to create the model because each shape is manually created. On the other hand, in a case where the parametric-type CAD software is used, the software can automatically execute remaining work required for generating a model by simply inputting required dimensional information. Therefore, it is possible to generate a model in a short time. Here, in order to use this function, it is necessary to prepare a template in advance. In a case where the template is prepared, generally, it is possible to construct a model by changing parameters to arbitrary dimensional values within a range that does not cause a topological failure. In the template, components included in the template are managed in units of components and for each generating method (for example, "extrusion"). For each component, a type (a line, a circle, a cylinder, or the like), a position, dimensions in a horizontal direction and a vertical direction, an angle, and a radius (in a case of a circle) of the component, a distance between two points in the component, a connection relationship between a plurality of components, and the like can be set. The types of the components described here and the connection relationship between the plurality of components are examples of setting items to be described later. By setting appropriate values in the setting items, it is possible to generate a three-dimensional model (parametric CAD model) in which a size of each component is flexibly changed, while maintaining characteristics of the shape of the original templated object.

Creating three-dimensional CAD data without any information is extremely time-consuming. However, with a parametric CAD model, it is possible to easily generate a three-dimensional model by simply setting numerical values such as dimensions and position information in the setting items of the template that is created in advance. Once the template is created, the template can be changed or adjusted later.

Figure 4:
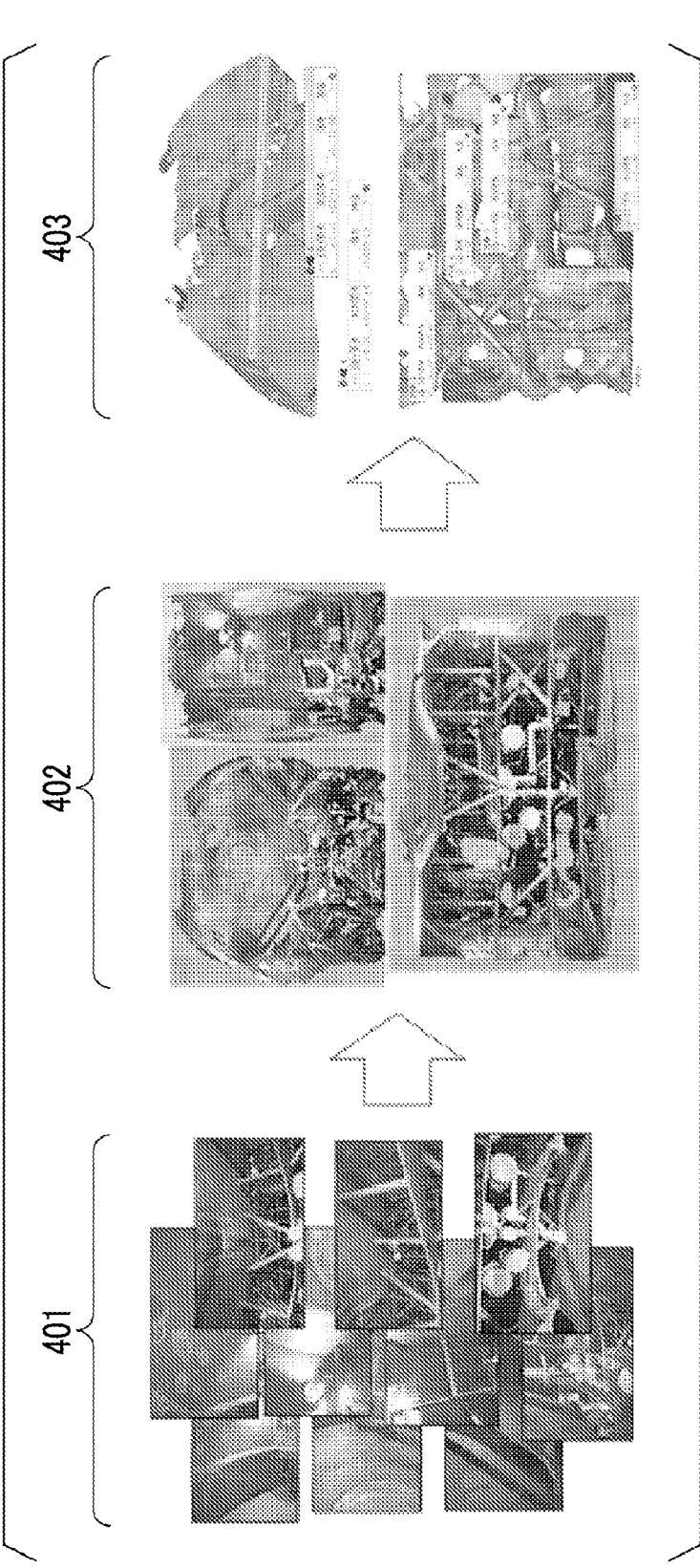
FIG. 4 is a schematic diagram of processing of generating a simple three-dimensional model according to the embodiment of the present disclosure.

The simple model generating unit 24 generates a simple three-dimensional model of the object based on the measurement data acquired by the data acquisition unit 21. The simple three-dimensional model is, for example, a point group (a set of pieces of coordinate data of a surface of the object), a standard triangulated language (STL, polygon data), or the like. As a method for generating a three-dimensional model from an image or three-dimensional coordinate data, any known method such as a photogrammetry method or a stereolithography method can be used. FIG. 4 illustrates an outline of processing of generating a three-dimensional model via a photogrammetry method. The data acquisition unit 21 acquires a plurality of images (401). The simple model generating unit 24 generates an integrated image by superimposing a common portion of each of the images (402), and creates a three-dimensional model based on the integrated image (403). The simple three-dimensional model does not have enough accuracy to be used for performance analysis as it is, but is generated for the purpose of measuring dimensions and the like to be set in a template required for generating a parametric CAD model.

Figures 6D, 7:
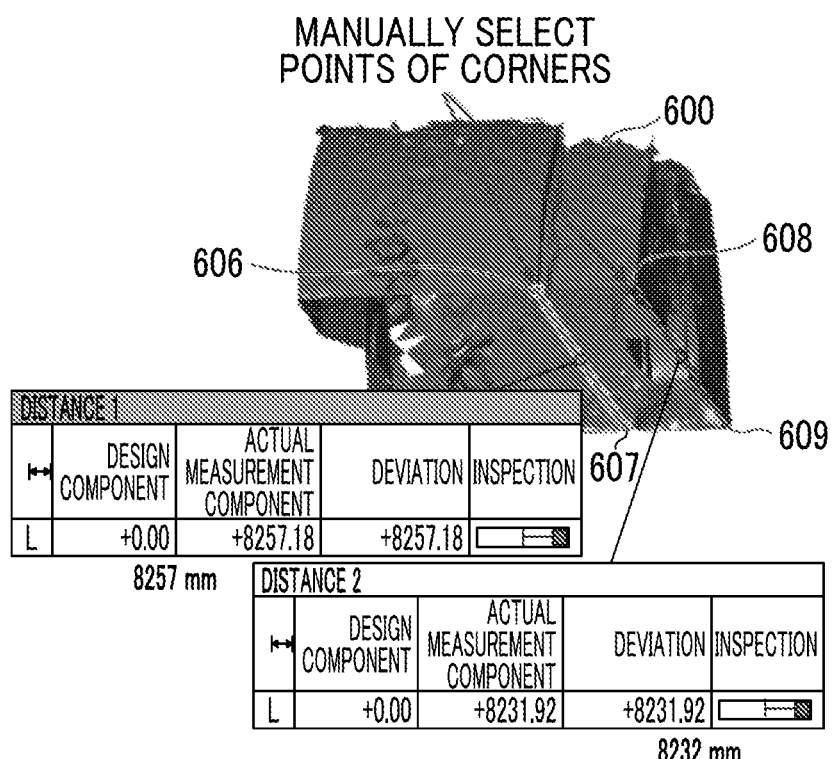
FIG. 6D is a fifth diagram explaining dimension measurement processing according to the embodiment of the present disclosure.
FIG. 7 is a first diagram explaining dimension measurement processing of a diffuser according to the embodiment of the present disclosure.

The dimension measurement unit 25 calculates dimensions and position information of each portion of the object based on the simple three-dimensional model generated by the simple model generating unit 24. For example, the dimension measurement unit 25 includes software which has a function of reading a three-dimensional model and calculating and illustrating a cross section of the three-dimensional model and a function of measuring a size, an area, an angle, and the like of each portion of the three-dimensional model. For example, for a pipe in a range 501 illustrated in FIG. 5, the dimension measurement unit 25 measures a diameter of the pipe by performing cylindrical approximation. For an angle 502, the dimension measurement unit 25 measures an angle 502 by calculating an angle between a member 503 and an "−X direction". For example, as illustrated in FIG. 6A, for a diameter of a member 600, the dimension measurement unit 25 measures an outer diameter of the member 600 with a caliper 601 interposing the member 600. Alternatively, as illustrated in FIG. 6B, the dimension measurement unit 25 measures an inner diameter of the member 600 with a caliper 601. As illustrated in FIG. 6C, in a case where a user designates a point 602 and a point 603 and inputs an instruction to measure a distance between the two points via the input reception unit 22, the dimension measurement unit 25 measures a length between the two points. Similarly, in a case where a user designates a point 604 and a point 605 and inputs an instruction to measure a distance between the two points via the input reception unit 22, the dimension measurement unit 25 measures a length between the two points. By slightly shifting measurement positions of the same portion in this way, a plurality of measurement results can be obtained. As illustrated in FIG. 6D, in a case where a point 606 and a point 607 are designated on a three-dimensional model when the member 600 is viewed from another angle, the dimension measurement unit 25 measures a length between the two points. In addition, in a case where a point 609 and a point 610 are designated, the dimension measurement unit 25 measures a length from the point 609 to the point 610. In this way, in a case where a user designates a portion (for example, a diameter of the member 600) for acquisition of dimensions, the dimension measurement unit 25 can perform measurement via various methods using the simple three-dimensional model. Therefore, for example, even in a case where the member 600 viewed from a certain direction has a chip or the like and it is difficult to measure dimensions such as a length, it is possible to measure dimensions of the same portion using the three-dimensional model viewed from another direction. Alternatively, even in a case where the three-dimensional model is viewed from the same direction, it is possible to measure dimensions of the same portion via a plurality of methods (for example, the outer diameter and the inner diameter in FIG. 6A and FIG. 6B, and the distance between the two different points in each of FIG. 6C and FIG. 6D). Thus, the measurement accuracy can be ensured. In a case where measurement is performed by a plurality of methods, the dimension measurement unit 25 may calculate an average of all the measurement values or an average of the remaining measurement values excluding a maximum value and a minimum value, and may output a value of the average as a final dimension measurement value of the portion.

The dimension measurement unit 25 can measure position information of each portion when a predetermined position is set as the origin. For example, in a case where a user designates a point 606 and instructs display of the coordinate information, the dimension measurement unit 25 measures and outputs position information of the point 606. For example, in a case where the template requires setting of the position information of the portion, a user can set the position information measured by the dimension measurement unit 25 for the setting item of the template.

Figure 8A:
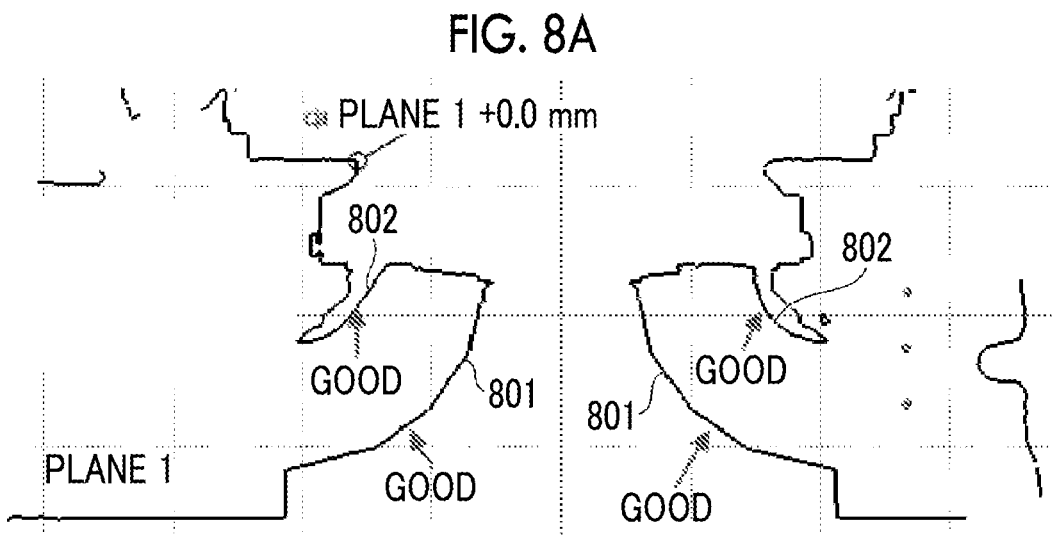
FIG. 8A is a second diagram explaining dimension measurement processing of a diffuser according to the embodiment of the present disclosure.
Figure 8B:
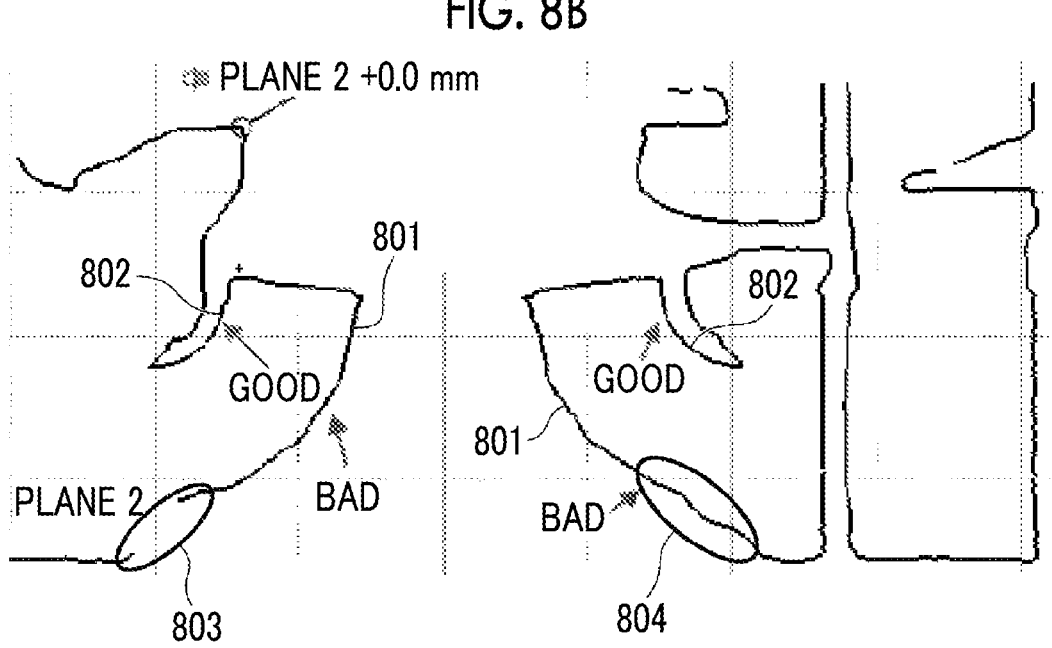
FIG. 8B is a third diagram explaining dimension measurement processing of a diffuser according to the embodiment of the present disclosure.
Figures 10A, 10B:
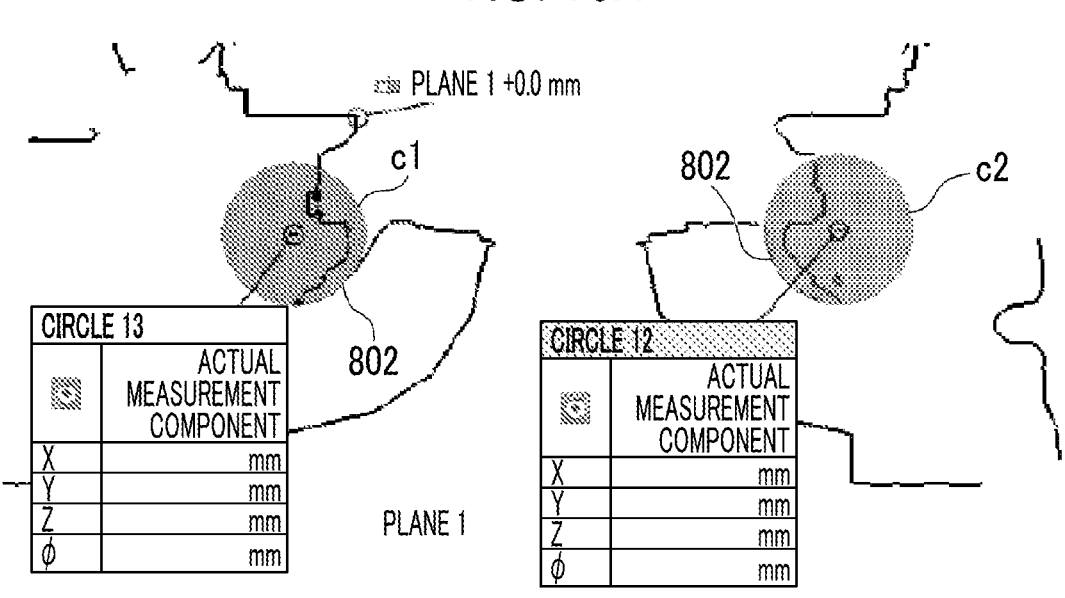
FIG. 10A is a fifth diagram explaining dimension measurement processing of a diffuser according to the embodiment of the present disclosure.
FIG. 10B is a sixth diagram explaining dimension measurement processing of a diffuser according to the embodiment of the present disclosure.

For a rotationally symmetric shape, the dimension measurement unit 25 estimates the shape by analyzing a plurality of cross sections passing through a rotation center, and measures the dimension. FIG. 7 illustrates an example of a simple three-dimensional model of a diffuser provided in a casing of a steam turbine. A hole through which a rotor passes is formed at a center portion of the diffuser, and a cone-shaped portion around the hole is called a bearing cone. A user designates planes 1 to 4 passing through a center P of the diffuser. In this case, the dimension measurement unit 25 calculates and illustrates cross sections when performing cutting along the planes 1 to 4. As an example, a cut surface of the plane 1 and a cut surface of the plane 2 are respectively illustrated in FIG. 8A and FIG. 8B. FIG. 8A and FIG. 8B illustrate a bearing cone 801 and a flow guide 802. The bearing cone 801 and the flow guide 802 are parts that are closely related to performance of the steam turbine and that require accuracy in modeling. The user determines qualities of the bearing cone 801 and the flow guide 802 which are illustrated, and inputs a determination result to the model generating device 20 via the input reception unit 22. For example, in a case of the bearing cone 801 of FIG. 8B, since there is a chip (range 803) and there is no corner (range 804), the user determines that the bearing cone 801 is "bad".

The dimension measurement unit 25 performs linear approximation on the data of the bearing cone 801 that is determined as "good" based on a user's instruction, and calculates the dimension of the bearing cone 801. As an example, FIG. 9 illustrates results of linear approximation and dimension measurement on a cross-sectional view taken along the plane 1. In FIG. 9, each of lines 17 to 24 is a straight line that approximates the shape of the bearing cone 801 for each predetermined section. The dimension measurement unit 25 calculates a length of each of the lines 17 to 24 (more precisely, coordinate positions of both ends of each of the approximate straight lines 17 to 24). Since the user's evaluation of the cut surface of the plane 2 is "bad", linear approximation and measurement are not performed. Although not illustrated, the dimension measurement unit 25 performs linear approximation for the cut surfaces of the plane 3 and the plane 4 for each predetermined section in the same manner as illustrated in FIG. 9, and measures a length of each straight line (more precisely, coordinate positions of both ends of each straight line). In addition, the dimension measurement unit 25 averages the measurement results of each cut surface, and calculates an approximate straight line of each section of the bearing cone 801 and a length of the approximate straight line. Since the shape of the bearing cone 801 is rotationally symmetric with respect to the point, it is possible to estimate the shape of the bearing cone 801 from each approximate straight line obtained by the averaging. In a case where it is desired to improve modeling accuracy of the bearing cone 801, improvement in accuracy can be expected by increasing the number of samples by performing cutting along a larger number of planes.

The dimension measurement unit 25 performs arc approximation on the data of the flow guide 802 that is determined as "good" based on a user's instruction, and calculates the dimension of the flow guide 802. As an example, FIG. 10A and FIG. 10B respectively illustrate results of arc approximation and dimension measurement on a cross-sectional view taken along the planes 1 and 2. The dimension measurement unit 25 approximates each flow guide 802 with arcs $c1$ to $c4$, respectively. The dimension measurement unit 25 measures position information of the center of each of the arcs $c1$ to $c4$ and a length of a diameter of each of the arcs $c1$ to $c4$. The dimension measurement unit 25 also approximates each flow guide 802 with an arc for the cut surfaces of the plane 3 and the plane 4, and measures position information of the center of the arc and a length of a diameter of the arc. In addition, the dimension measurement unit 25 calculates a coordinate position and an average diameter of the arc that approximates the flow guide 802 by averaging results obtained by measuring each cut surface. Since the shape of the flow guide 802 is rotationally symmetric with respect to the point, it is possible to estimate the shape of the flow guide 802 from the arc obtained by the averaging. In a case where it is desired to improve modeling accuracy of the flow guide 802, improvement in accuracy can be expected by increasing the number of samples by performing cutting along a larger number of planes. The approximation of the bearing cone 801 with a plurality of straight lines and the approximation of the flow guide 802 with arcs are well known to a person who has engineering knowledge of a steam turbine. Regardless of manufacturers of the casing, the dimensions of the bearing cone 801 and the flow guide 802 can be measured with high accuracy using the same method.

Figure 11:
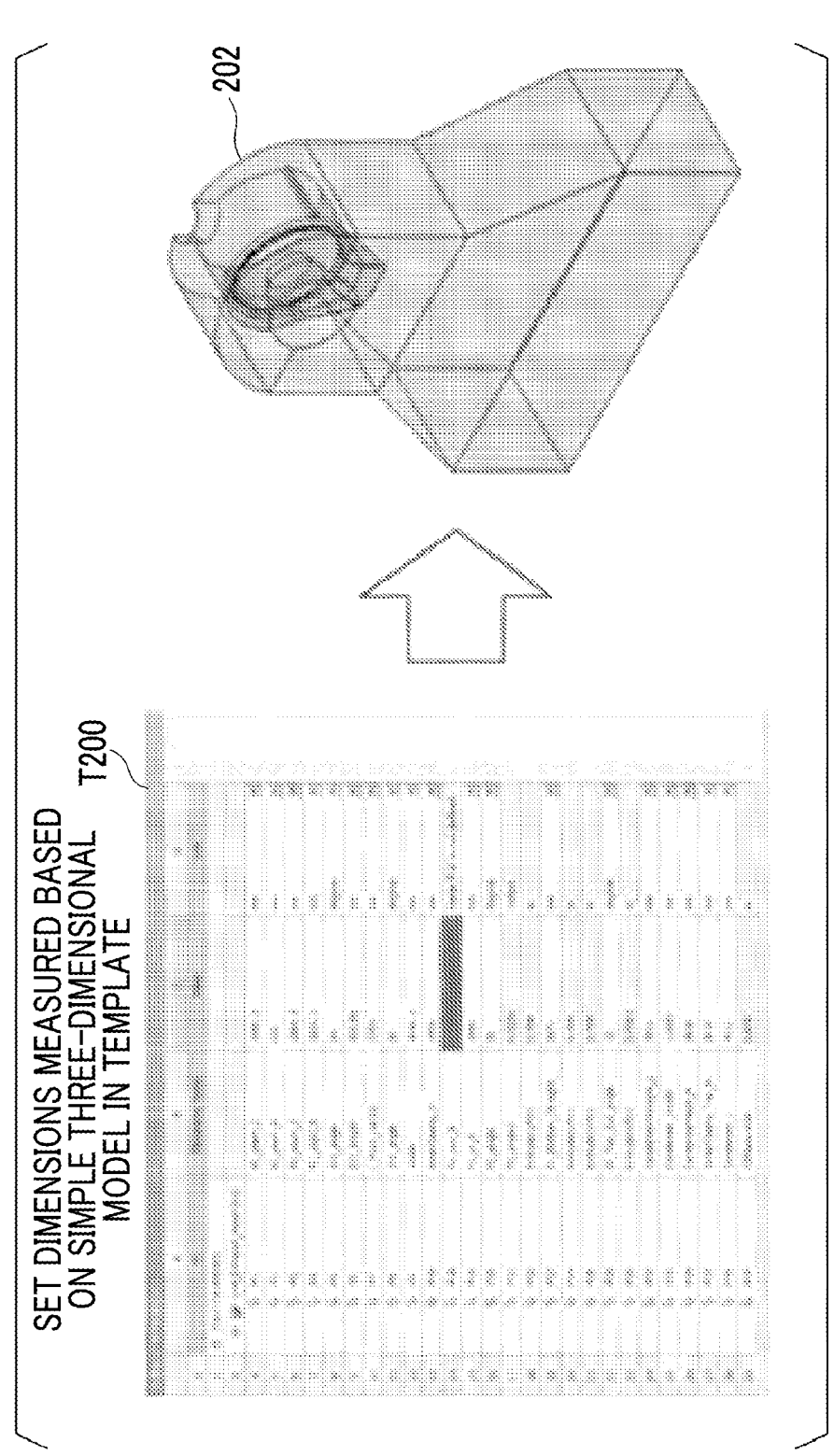
FIG. 11 is a diagram explaining setting of dimensions in a template according to the embodiment of the present disclosure.

The model generating unit 26 generates a three-dimensional model (parametric CAD model) of the object by setting the dimensions measured by the dimension measurement unit 25 in the template of the parametric CAD model, the template being created by the template creating unit 23. For example, the model generating unit 26 includes software having a parametric CAD function (parametric-type CAD software). As illustrated in FIG. 11, such software includes an interface T200 for setting a value in a setting item of a template. The user inputs the dimensions and the position information measured by the dimension measurement unit 25 via the interface T200. The model generating unit 26 reads the dimensions and the position information which are input, sets each value in the template, and generates a three-dimensional model 202 (parametric CAD model) of the object. In a case where the three-dimensional model 202 of FIG. 11 is compared with the three-dimensional model based on the CAD data illustrated in FIG. 2, a simple three-dimensional model is generated. In the case of the three-dimensional model illustrated in FIG. 2, since the model is generated without any information by using general-purpose CAD software, it takes a very long time (for example, one month to two months). A model cannot be generated without detailed dimension data. Meanwhile, performance of the casing (low-pressure exhaust chamber) of the steam turbine in this example is evaluated by "pressure recovery performance", and a value of the performance is largely defined by dimensions, shapes, arrangement, and the like of an exhaust chamber body and main internal members, for example, the diffuser including the bearing cone and the flow guide. In other words, since an influence of other small internal members on the performance is small and can be estimated to some extent using another method, the purpose can also be achieved by performance evaluation using the three-dimensional model 202 illustrated in FIG. 11, which excludes small internal members. Further, even in a case where there is an omission in detailed measurement data or a defect in the simple three-dimensional model, it is possible to generate the three-dimensional model 202 in a short time (for example, one week to two weeks).

The output unit 27 displays the simple three-dimensional model generated by the simple model generating unit 24, the view of the cut surface calculated by the dimension measurement unit 25, the three-dimensional model 202 generated by the model generating unit 26, and the like on the display device 30.

The storage unit 28 stores the measurement data acquired by the data acquisition unit 21, the simple three-dimensional model (point group data or STL) generated by the simple model generating unit 24, the template of the parametric CAD model, information such as setting items, and the like, the template being created by the template creating unit 23.

The display device 30 is configured by using a liquid-crystal display or the like. The display device 30 displays information that is output by the output unit 27.

(Operation)

Figure 12:
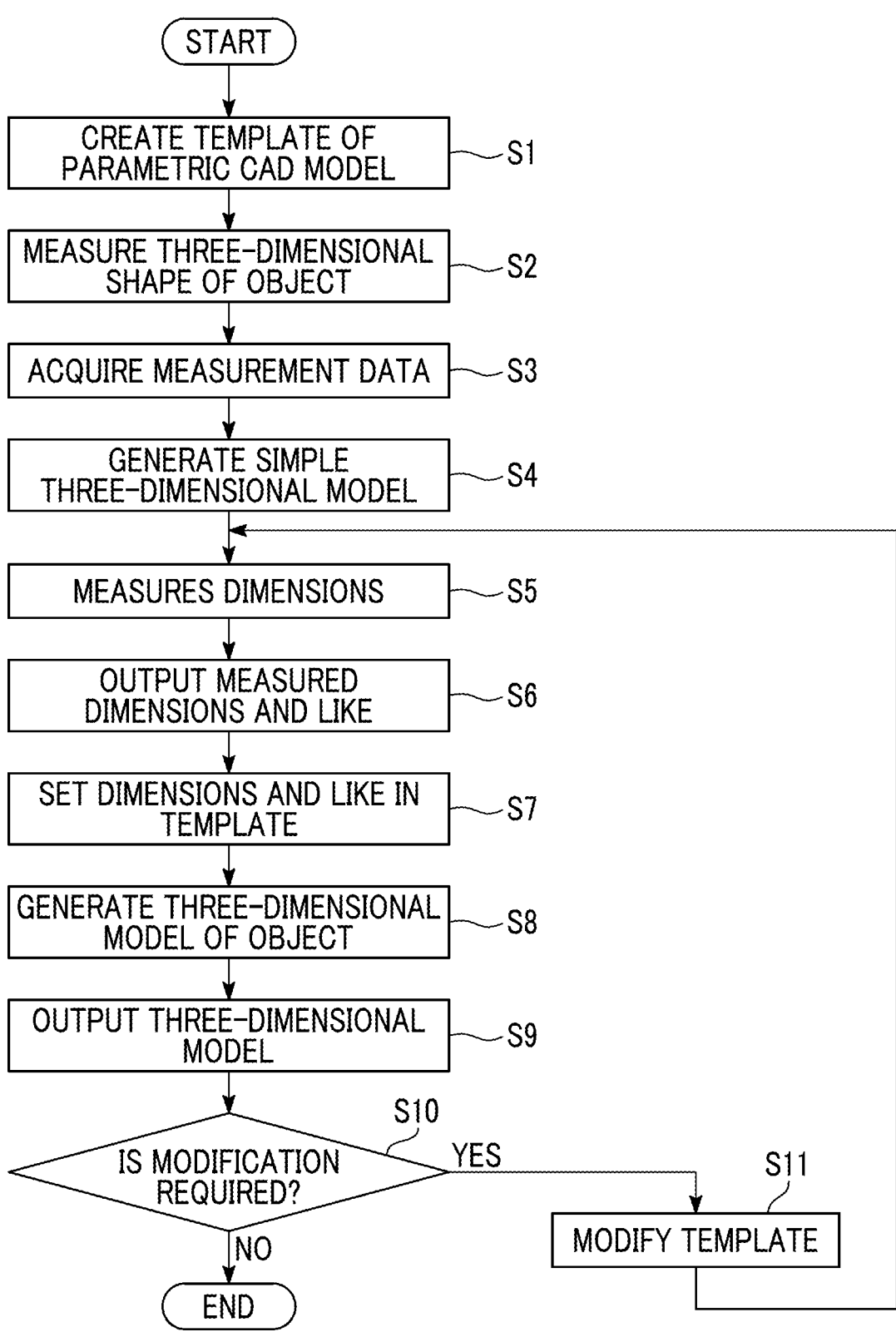
FIG. 12 is a flowchart illustrating an example of model generating processing according to the embodiment of the present disclosure.

Next, a flow of model generating processing using the model generating system 100 will be described with reference to FIG. 12.

First, the template creating unit 23 creates a template of the parametric CAD model (step S1). The user creates a template of an object such as a casing of a steam turbine by using the function of the template creating unit 23. In a case where there are a plurality of types of shapes of the object, the user creates a plurality of templates. The template creating unit 23 records the created template in the storage unit 28.

Next, a three-dimensional shape of the object is measured using the measurement device 10 (step S2). For example, the user measures the shape of the inside of the casing by using a camera, a three-dimensional distance meter, or the like. By capturing an image using the camera, it is possible to perform measurement in a short time. By performing measurement using the three-dimensional distance meter, it is possible to measure the shape of the inside with higher accuracy. However, the measurement range is limited, and thus, it takes a long time for the measurement. In a case where measurement is performed using the three-dimensional distance meter, processing of generating an integrated image by integrating a plurality of images and processing of generating a three-dimensional model such as STL from images can be omitted. Thus, a processing time can be shortened. The user may use the camera and the three-dimensional distance meter together based on a feature of the measurement device 10. For example, in performance analysis after the three-dimensional model is generated, measurement may be performed using the three-dimensional distance meter for a portion that has a large influence on the performance, and measurement may be performed by capturing an image for a portion that is not significantly related to the performance.

Next, the data acquisition unit 21 acquires measurement data that is measured by the measurement device 10 (step S3). The data acquisition unit 21 records the acquired measurement data in the storage unit 28. Next, the simple model generating unit 24 generates a simple three-dimensional model based on the measurement data that is recorded in the storage unit 28 (step S4). Since the simple three-dimensional model is intended for obtaining dimensions, there is no problem as long as main dimensions and position information can be measured even in a case where there are chips or distortions. The simple model generating unit 24 generates a simple three-dimensional model of the object by using a known technique such as a photogrammetry method.

Next, the dimension measurement unit 25 measures dimensions based on the simple three-dimensional model (step S5). The dimension measurement unit 25 measures dimensions included in the setting items of the template of the object, based on a user's instruction. For example, in a case of measuring a length of a certain member, a length of the member is measured by measuring a length of the member using a plurality of methods (such as slightly shifting the measurement position) and calculating an average value or the like of the length. Thereby, even in a case where there is a defect such as a chip in the simple three-dimensional model, accuracy of the measured dimensions can be maintained. In a case of instructing measurement of dimensions, the user may designate an approximation method. For example, the user may instruct cylindrical approximation for a side surface of a pipe, and may measure a diameter of the pipe via the cylindrical approximation. For example, the user may instruct circular approximation for a cross section of a pipe, and may measure a diameter of the pipe via the circular approximation. In order to improve the measurement accuracy of the pipe diameter by the circular approximation, cross sections may be generated at a large number of positions of the pipe, and the circular approximation may be performed for each cross section. Similarly, the dimension measurement unit 25 can approximate a shape of a portion to be measured by using a figure such as a triangle, an ellipse, a rectangular plane, a polygon, a rectangular parallelepiped, a polyhedron, or a sphere according to the shape of the portion, and measure dimensions and position information of the target portion based on the approximated figure. For a curved surface such as the bearing cone 801 and the flow guide 802 illustrated in FIG. 8A or the like, the curved surface may be divided into predetermined sections, and each divided section may be approximated by a straight line. Alternatively, the entire curved surface may be approximated by an arc or an ellipse. The output unit 27 outputs the dimensions and the position information that are measured by the dimension measurement unit 25 to the display device 30 together with the simple three-dimensional model, the cross-sectional view of the portion, or the like (step S6). The user confirms whether or not the required dimensions are measured. In a case where there is a deficiency, the user causes the dimension measurement unit 25 to perform measurement by performing a predetermined operation.

Next, the model generating unit 26 sets the dimensions and the like output in step S6 to the setting items of the template created in step S1 (step S7). For example, the user inputs the dimensions measured by the dimension measurement unit 25 to the interface T200. In a case where a plurality of templates are created in step S1, the user checks the shape and the dimensions of the simple three-dimensional model, selects a template having the closest shape, and inputs the measured dimensions and the measured position information in the setting items of the template. In a case where the dimensions and the position information are set in the setting items, the model generating unit 26 generates a three-dimensional model (parametric CAD model) of the object (step S8). The output unit 27 outputs the generated three-dimensional model to the display device 30 (step S9) The user checks the three-dimensional model that is output by the display device 30 and determines whether or not modification is required (step S10). In a case where modification is not required (No in step S10), processing of generating the three-dimensional model is completed. The user performs performance analysis or the like using the generated three-dimensional model. In a case where modification is required (Yes in step S10), the user modifies the template of the parametric CAD model (step S11) In a case where the template is modified, processing from step S5 is repeated as necessary.

As described above, according to the present embodiment, by performing processing of (1) preparing a template of the parametric CAD model for generating a model of an object, (2) measuring a three-dimensional shape of the object in a non-contact manner in order to acquire dimension information required for generating a three-dimensional model, (3) constructing a simple three-dimensional model (a point group or an STL) using the measurement results, (4) extracting dimensions and position information to be set in the template from the simple three-dimensional model, and (5) generating a three-dimensional model using the parametric CAD template, it is possible to generate a three-dimensional model of an object for which there is no drawing information in a short time. By measuring the shape in a non-contact manner and generating a simple three-dimensional model using the measurement data, for a structure whose internal space is difficult for a person to enter and perform measurement (for example, a structure having an internal space, a structure in which various structures such as pipes are provided in the internal space, or the like), such as a casing (particularly, a low-pressure exhaust chamber) or a boiler of a steam turbine, it is possible to generate a three-dimensional model of the structure. Thereby, it is possible to generate a three-dimensional model for evaluation purposes in a short time when replacing another company's products, when replacing large machines such as low-pressure turbines, or during remodeling work.

Figure 13:
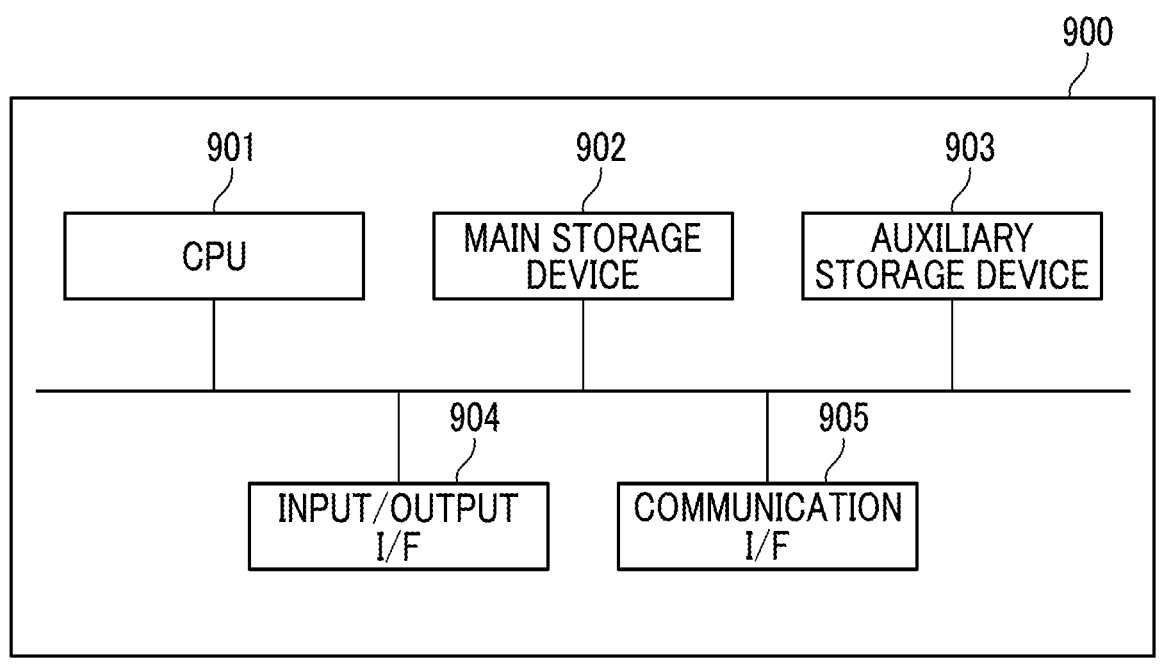
FIG. 13 is a diagram illustrating an example of a hardware configuration of the model generating device according to the embodiment of the present disclosure.

FIG. 13 is a diagram illustrating an example of a hardware configuration of the model generating device according to the embodiment of the present disclosure. A computer 900 includes a CPU 901, a main storage device 902, an auxiliary storage device 903, an input/output interface 904, and a communication interface 905. The model generating device 20 is provided in the computer 900. Each of the functions described above is stored in the auxiliary storage device 903 in a program form. The CPU 901 reads out the program from the auxiliary storage device 903, expands the program in the main storage device 902, and executes the above processing according to the program. The CPU 901 allocates a storage area in the main storage device 902 according to the program. The CPU 901 allocates a storage area for storing data being processed in the auxiliary storage device 903 according to the program.

By recording a program for realizing all or some of the functions of the model generating device 20 on a computer-readable recording medium, and by reading the program recorded on the recording medium into a computer system and executing the read program, the processing by each functional unit may be performed. The "computer system" herein includes an OS and hardware such as a peripheral device. The "computer system" also includes a homepage providing environment (or display environment) in a case where a WWW system is used. The "computer-readable recording medium" refers to a portable medium such as a CD, a DVD, or a USB, or a storage device such as a hard disk built into the computer system. In a case where the program is distributed to the computer 900 by a communication line, the computer 900 to which the program is distributed may expand the program in the main storage device 902 and execute the above processing. The above program may be for realizing a part of the above functions, or may further realize the above functions in combination with a program already recorded in the computer system. The CPU 901 may be configured with a plurality of computers 900. The storage unit 28 may be stored in an external storage device separate from the computer 900.

In addition, the components of the above-mentioned embodiment can be appropriately replaced with well-known components without departing from the scope of the present invention. The scope of the present invention is not limited to the above-mentioned embodiment, and the present invention can include various changes without departing from the scope of the present invention.

APPENDIX

The model generating device 20, the model generating system 100, the model generating method, and the program described in the embodiment are understood as follows, for example.

(1) According to a first aspect, the model generating device 20 includes: an acquisition unit that acquires measurement data of a three-dimensional shape of an object; a simple three-dimensional model generating unit that generates a three-dimensional model based on the measurement data; a dimension measurement unit that measures dimensions or position information of a predetermined portion of the object based on the three-dimensional model; and a model generating unit that generates a parametric three-dimensional model of the object by setting the measured dimensions or the measured position information in a template of the parametric three-dimensional model of the object.

Thereby, it is possible to generate a three-dimensional model of the object in a short time even in a case where there is no drawing information of the object.

(2) According to a second aspect, in the model generating device 20 described in (1), the dimension measurement unit 25 measures the dimensions of the predetermined portion via a plurality of methods, and calculates the dimensions of the predetermined portion based on a measurement result.

Thereby, it is possible to maintain the measurement accuracy of the dimensions even in a case where the three-dimensional model has defects or distortions.

(3) According to a third aspect, in the model generating device 20 described in (1) or (2), the dimension measurement unit approximates the predetermined portion with any one figure of a triangle, a circle, an arc, an ellipse, a rectangular plane, a polygon, a rectangular parallelepiped, a polyhedron, a cylinder, a sphere, or a straight line, and measures the dimensions of the predetermined portion based on the figure used for approximation.

Thereby, even in a case where the three-dimensional model has defects or distortions, it is possible to measure the dimensions of the predetermined portion.

(4) According to a fourth aspect, in the model generating device 20 described in any one of (1) to (3), the measurement data is an image obtained by capturing the object, and the simple three-dimensional model generating unit generates the three-dimensional model via a photogrammetry method based on the image.

Thereby, it is possible to generate a simple three-dimensional model to be used for measuring the dimensions.

(5) According to a fifth aspect, in the model generating device 20 described in any one of (1) to (4), the measurement data is three-dimensional position information indicating a shape of the object (for example, a shape of the outer surface of the object, or a shape of the inner surface of the object), and the simple three-dimensional model generating unit generates the three-dimensional model based on the three-dimensional position information.

Thereby, it is possible to generate a simple three-dimensional model to be used for measuring the dimensions. For example, the simple three-dimensional model may be a set (point group) of position information measured by a three-dimensional distance meter.

(6) According to a sixth aspect, the model generating system 100 includes: a measurement device that measures a three-dimensional shape of an object; and the model generating device described in (1) to (5).

Accordingly, it is possible to generate a three-dimensional model of an object for which there is no drawing information in a short time.

(7) According to a seventh aspect, in the model generating system 100 described in (6), the object has a shape including a space therein, and the measurement data is measured by mounting the measurement device on a moving body and moving the moving body in the space.

Thereby, even for an object having an internal shape whose space is difficult for a person to enter and measure the shape, it is possible to measure the internal shape of the object and to generate a three-dimensional model.

(8) According to an eighth aspect, in the model generating system 100 described in (6) or (7), the object has a shape including a space therein, and the measurement data is measured by mounting the measurement device on a predetermined member (a rod-shaped member, a plate-shaped member, a member hanging on a tip of a rod, or the like) and inserting the member into the space.

Thereby, even for an object having an internal shape whose space is difficult for a person to enter and measure the shape, it is possible to measure the internal shape of the object and to generate a three-dimensional model.

(9) According to a ninth aspect, the model generating method includes a step of acquiring measurement data of a three-dimensional shape of an object; a step of generating a three-dimensional model based on the measurement data; a step of measuring dimensions or position information of a predetermined portion of the object based on the three-dimensional model; and a step of generating a parametric three-dimensional model of the object by setting the measured dimensions or the measured position information in a template of the parametric three-dimensional model of the object.

(10) According to a tenth aspect, the program causes a computer to execute a process including: a step of acquiring measurement data of a three-dimensional shape of an object; a step of generating a three-dimensional model based on the measurement data; a step of measuring dimensions or position information of a predetermined portion of the object based on the three-dimensional model; and a step of generating a parametric three-dimensional model of the object by setting the measured dimensions or the measured position information in a template of the parametric three-dimensional model of the object.

INDUSTRIAL APPLICABILITY

According to the model generating device, the model generating system, the model generating method, and the program described above, it is possible to generate a three-dimensional model of an object in a short time.

REFERENCE SIGNS LIST

10: measurement device
20: model generating device
21: data acquisition unit
22: input reception unit
23: template creating unit
24: simple model generating unit
25: dimension measurement unit
26: model generating unit
27: output unit
28: storage unit
30: display device
100: model generating system
900: computer
901: CPU
902: main storage device
903: auxiliary storage device
904: input/output interface
905: communication interface

The invention claimed is:

1. A model generating device comprising:

at least one processor with a memory comprising instructions that, when executed by the at least one processor, cause the at least one processor to implement:

an acquisition unit that acquires measurement data of a three-dimensional shape of an object;

a simple three-dimensional model generating unit that generates a first three-dimensional model of the object for measuring dimensions or position information to set to a template of a parametric three-dimensional model of the object based on the measurement data;

a dimension measurement unit that measures dimensions or position information of a predetermined portion included in setting items of the template in the first three-dimensional model; and a model generating unit that generates the parametric three-dimensional model of the object by setting the measured dimensions or the measured position information to the setting items of the template corresponding to the predetermined portion.

2. The model generating device according to claim 1, wherein the dimension measurement unit measures the dimensions of the predetermined portion multiple times by shifting a measurement position, and calculates the dimensions of the predetermined portion by calculating an average value based on a measurement result.

3. The model generating device according to claim 1, wherein the dimension measurement unit approximates the predetermined portion with any one figure of a triangle, a circle, an arc, an ellipse, a rectangular plane, a polygon, a rectangular parallelepiped, a polyhedron, a cylinder, a sphere, or a straight line, and measures the dimensions of the predetermined portion based on the figure used for approximation.

4. The model generating device according to claim 1, wherein the measurement data is an image obtained by capturing the object, and the simple three-dimensional model generating unit generates the first three-dimensional model via a photogrammetry method based on the image.

5. The model generating device according to claim 1, wherein the measurement data is three-dimensional position information indicating a shape of the object, and the simple three-dimensional model generating unit generates the first three-dimensional model based on the three-dimensional position information.

6. The model generating device according to claim 1, wherein the first three-dimensional model of the object has lower accuracy than that of the parametric three-dimensional model of the object.

7. The model generating device according to claim 6, wherein the first three-dimensional model of the object is a set of pieces of coordinate data of a surface of the object, or a standard triangulated language (STL) polygon data.

8. A model generating system comprising:

a measurement device that measures the three-dimensional shape of the object; and the model generating device according to claim 1.

9. The model generating system according to claim 8, wherein the object has the three-dimensional shape including a space therein, and the measurement data is measured by mounting the measurement device on a moving body and moving the moving body in the space.

10. The model generating system according to claim 8, wherein the object has the three-dimensional shape including a space therein, and the measurement data is measured by mounting the measurement device on a predetermined member and inserting the member into the space.

11. A model generating method comprising:

a step of acquiring measurement data of a three-dimensional shape of an object;

a step of generating a first three-dimensional model of the object for measuring dimensions or position information to set to a template of a parametric three-dimensional model of the object based on the measurement data;

a step of measuring dimensions or position information of a predetermined portion included in setting items of the template in the first three-dimensional model; and a step of generating the parametric three-dimensional model of the object by setting the measured dimensions or the measured position information to the setting items of the template corresponding to the predetermined portion.

12. A non-transitory computer readable recording medium storing a program causing a computer to execute a process comprising:

a step of acquiring measurement data of a three-dimensional shape of an object;

a step of generating a first three-dimensional model of the object for measuring dimensions or position information to set to a template of a parametric three-dimensional model of the object based on the measurement data;

a step of measuring dimensions or position information of a predetermined portion included in setting items of the template in the first three-dimensional model; and a step of generating the parametric three-dimensional model of the object by setting the measured dimensions or the measured position information to the setting items of the template corresponding to the predetermined portion.

* * * * *